(12) United States Patent
Marsetti

(10) Patent No.: US 6,260,245 B1
(45) Date of Patent: Jul. 17, 2001

(54) CLAMPING MEMBER FOR AT LEAST ONE SUPPORT PIN FOR BELT CONVEYOR COMPONENTS

(75) Inventor: Sergio Marsetti, Castelli Calepio (IT)

(73) Assignee: System Plast S.p.A. (IT)

( * ) Notice: Subject to any disclaimer, the term of this patent is extended or adjusted under 35 U.S.C. 154(b) by 0 days.

(21) Appl. No.: 09/299,899

(22) Filed: Apr. 27, 1999

(30) Foreign Application Priority Data

Apr. 27, 1998 (IT) ............................................. MI98 U0296

(51) Int. Cl.[7] .................................................. B65G 21/20
(52) U.S. Cl. ...................... 24/658; 198/836.3; 24/115 G; 403/326
(58) Field of Search .............................. 24/658, 656, 654, 24/652, 629, 588, 572, 115 G; 198/836.1, 836.3; 403/321, 326, 327

(56) References Cited

U.S. PATENT DOCUMENTS

| 233,255 | * | 10/1880 | Kimble | 24/658 |
|---|---|---|---|---|
| 3,647,051 | * | 3/1972 | Didas | 198/836.3 |
| 3,776,350 | * | 12/1973 | Tice | 198/836.3 |
| 4,502,594 | * | 3/1985 | Sijbrandij | 198/836.3 |
| 5,078,310 | * | 1/1992 | Ferry | 24/115 G X |
| 5,224,245 | * | 7/1993 | Matoba | 24/115 G |
| 5,323,514 | * | 6/1994 | Masuda et al. | 24/115 G |
| 5,335,782 | * | 8/1994 | Herzog | 198/836.3 |
| 5,527,125 | * | 6/1996 | Kreuzer et al. | 403/326 X |
| 5,533,826 | * | 7/1996 | Cairns | 198/836.3 X |
| 5,681,257 | * | 10/1997 | Letourneur | 403/327 X |
| 5,711,032 | * | 1/1998 | Carpenter | 24/115 G X |
| 5,819,911 | * | 10/1998 | Ledingham | 198/836.3 |
| 6,003,662 | * | 12/1999 | McCaffrey et al. | 198/836.3 |

FOREIGN PATENT DOCUMENTS

| 2211915 | 2/1998 | (CA) . | |
|---|---|---|---|
| 4242119 | 6/1994 | (DE) . | |
| 636995 | * | 5/1950 | (GB) ................................. 24/658 |
| 159792 | 9/1981 | (GB) . | |
| 9818697 | 5/1998 | (WO) . | |

* cited by examiner

Primary Examiner—Robert J. Sandy
(74) Attorney, Agent, or Firm—Steinberg & Raskin, P.C.

(57) ABSTRACT

A clamping member for a support pin of components for belt conveyors, for example guide elements. The clamping member having a cylindrical housing and a throughbore extending through the housing for receiving the pin. The clamping member includes a spring loaded movable element coaxially arranged within the housing and being adapted to securely retain the pin within the clamping member. The movable element is selectively movable within the housing from a locked position in which the pin is securely retained in the housing to a clearance position in which the pin can be manually removed from the housing.

19 Claims, 2 Drawing Sheets

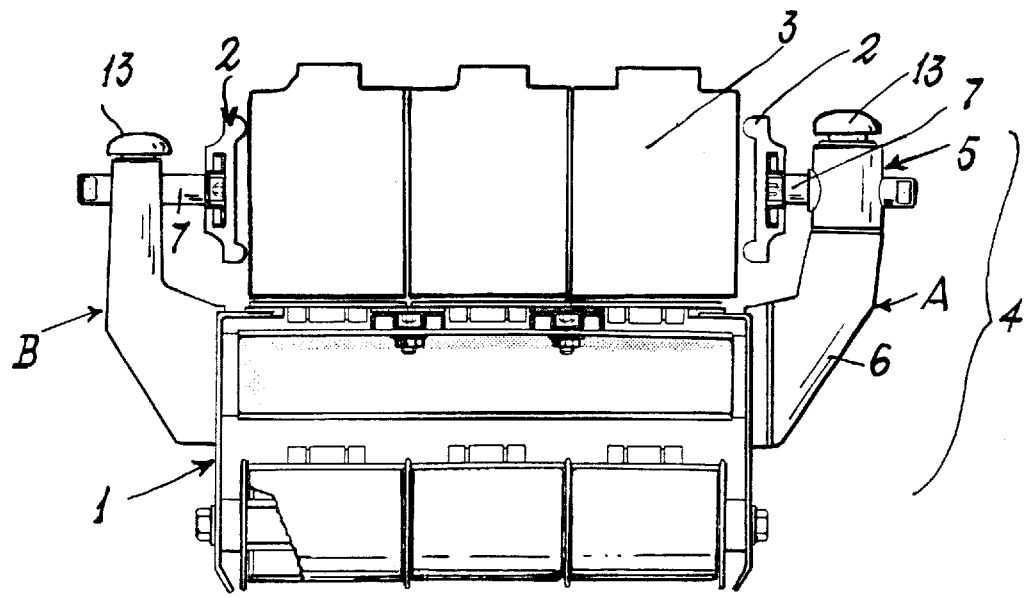
Fig. 1
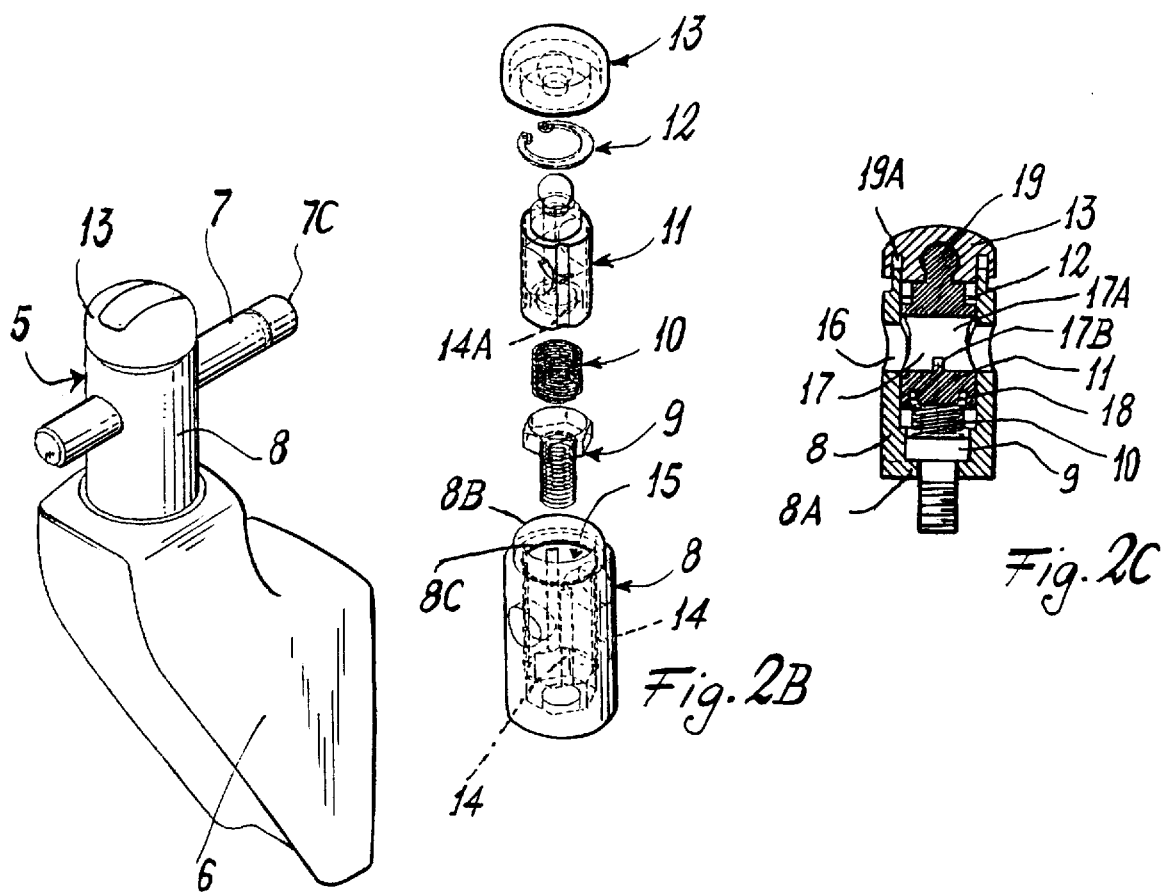
Fig. 2A
Fig. 2B
Fig. 2C

CLAMPING MEMBER FOR AT LEAST ONE SUPPORT PIN FOR BELT CONVEYOR COMPONENTS

FIELD OF THE INVENTION

This invention relates to a clamping member for at least one support pin for belt conveyor components, for example guide elements.

BACKGROUND OF THE INVENTION

Known belt conveyors comprise lateral guide elements for the conveyed products, these guide elements generally being connected to the support structure of the belt conveyor or conveyors by a plurality of parts comprising a pin and a clamping head for said pin.

It should be noted that the lateral guide elements can take various forms and that the pins may also support other usual conveyor components, for example rollers or photoelectric cells.

In known clamping members a portion of the pin is inserted into a through hole provided in the clamping head and is rigidly secured thereto by a screw. This latter engages in a threaded hole perpendicular to and communicating with that into which the pin is inserted, such that the end of the screw can make contact with that pin portion housed in the head, and which on tightening the screw becomes rigidly secured to the head. To facilitate tightening of the screw, it generally carries an associated handwheel or handle.

The operations involved in tightening the screw to position the guide elements and more generally the conveyor components in the desired manner are relatively burdensome in terms both of time and of the effort required.

It should also be noted that in known systems the pin is secured to the relative head only if the screw is sufficiently tightened. However it often happens that the screw slackens with the passage of time or, because of lack of attention, is not tightened with the necessary force.

OBJECTS AND SUMMARY OF THE INVENTION

An object of this invention is to provide a clamping member which by making the operations faster and less fatiguing simplifies the operations involved in securing the pins to the relative heads, while at the same time providing a perfect connection between the pin and the head which remains reliable with time.

A further object is to provide a clamping member which comprises a small number of pieces and is therefore of simple low-cost construction.

These and further objects are attained by a device in accordance with the characterising part of the main claim.

BRIEF DESCRIPTION OF THE DRAWINGS

The invention will be more apparent from the accompanying drawings, which are provided by way of non-limiting example and on which:

FIG. 1 is a schematic cross-section through a conventional conveyor comprising two different clamping members according to the invention.

FIGS. 2A, 2B, 2C, 3A, 3B, 3C, 4A, 4B, 4C are respectively a schematic perspective, exploded and longitudinal sectional view of a first, a second and a third embodiment of a clamping member of the invention.

Referring to FIG. 1, this shows a belt conveyor of conventional type, indicated overall by 1, comprising lateral guide elements 2 (also conventional) for the conveyed products 3. The guide elements 2 are connected to a support structure, indicated overall by 4, comprising a pin 7, and a member 5 according to the invention for clamping the pin 4.

Figure 3A:
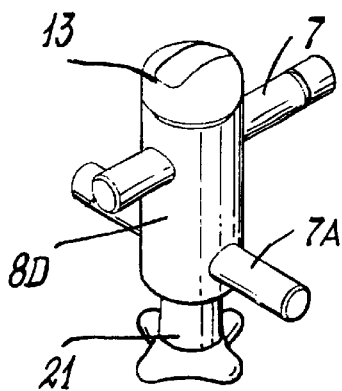

In a first embodiment (indicated by A in FIG. 1 and also shown in FIGS. 2A–2C) the clamping member 5 is removably connected to an arm 6 of conventional type.

The clamping member 5 comprises a main body or head 8, a screw 9 for fixing the member 5 to the arm 6, a spring 10, an inner movable element 11, a circlip 12 and a knob 13.

The head 8, which is cylindrical in the example, has a coaxial hole defining a seat 15 for the movable element 11 and comprising projecting guide ribs 14 which, by cooperating with grooves 14A provided in the movable element 11, enable this latter to move only coaxially to the head 8. The seat 15 is closed lowerly by a base wall 8A comprising a central hole for passage of the threaded shank of the screw 9, the head of which rests on the inner face of said base wall 8A.

A hole 16 for passage of the pin 7 is provided in the lateral wall of the head 8.

The movable element 11, which is cylindrical in the example, has a hole 17 for passage of the pin 7, this hole preferably having a greater diameter than the hole 16 provided in the head 8. Lowerly, the movable element 11 comprises an annular groove 18 for housing one end of the spring 10; upperly, the element comprises a projection 19 for its snap-connection to the knob 13. The movable element 11 is shaped such that when inserted into the head 8 and the spring 10 exerts an upward thrust, it can still be pushed downwards against the spring so that the two holes 16 and 17 become coaxial and the pin 7 can be inserted through them. From a lower portion of the wall 17A defining the hole 17 there projects into the hole a locking element 17B (FIG. 2C). This latter cooperates with annular grooves 7A, 7B, and 7C provided in the pin 7 in order both to lock the pin and to allow it to be rapidly and precisely positioned.

The knob 13 advantageously comprises an annular groove 19A for the upper edge 8B of the head 8, and a seat for snap-housing the projection 19 on the movable element.

The clamping member is very easily and quickly assembled. The screw 9 is firstly inserted into the head 8, followed by the spring 10 and the movable element 11. While then pressing the movable element 11 downwards against the spring 10, the pin 7 is inserted through the holes 16, 17. The circlip 12 is then inserted to snap into an annular groove 8C in the inner wall of the seat 15 for the head 8. The circlip 12 prevents the element 11 escaping from the head 8. Finally the knob 13 is snap-fitted onto the movable element 11. When the clamping member has been mounted, to insert the pin 7 through the head 8 and secure it thereto it is necessary merely to push the knob 13 downwards against the spring 10, so that the hole 16 in the movable element 11 and the hole 17 in the head 8 become aligned to allow passage of the pin 7. Then on releasing the knob 13 the pin remains reliably secured to the head 8 by the action of the spring 10. To improve the locking of the pin and facilitate its positioning, the pin comprises the plurality of annular grooves 7A–7C. On snapping into one of the grooves 7A–7C the locking element 17B on the one hand effectively locks the pin while on the other hand "advising" that the pin has be positioned at a precise distance. In this respect, each groove 7A–7C corresponds to a precise distance of the end 7C of the pin from the clamping member. In this manner, pin positioning is extremely simple compared with known clamping members and pins.

It should be noted that the principle of operation is quite different from that of clamping members of the prior art. In this respect the pin 7 is always stably secured to the head 8. The knob 13 is used only to enable the pin to be connected to the head, and not to clamp the pin to the head as in known members. In this manner it is no longer possible for the connection between the pin and head to slacken either with the passage of time or by error.

Figure 3B:
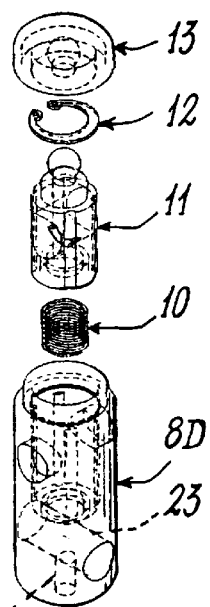
Figure 3C:
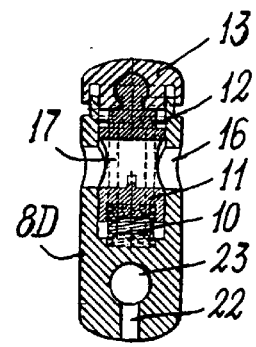

FIGS. 3A–3C show a clamping member incorporating both "elastic" clamping means of type similar to those described heretofore (parts in common with the preceding embodiment are indicated by the same numbers), and clamping means of traditional type, comprising a screw 20 rigidly fixed to a handwheel 21. The screw 20 is arranged to penetrate into a threaded hole 22 provided in the lower end of the head 8D and communicating with a hole 23 for the insertion of a second pin 7A. The pin 7A is locked to the head 8 by tightening the screw 20.

Figure 4A:
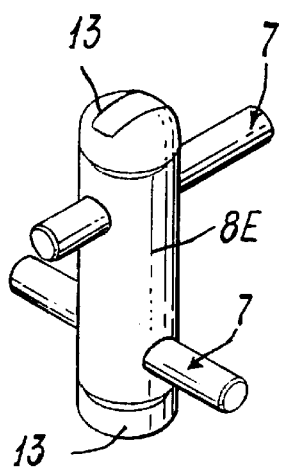
Figure 4B:
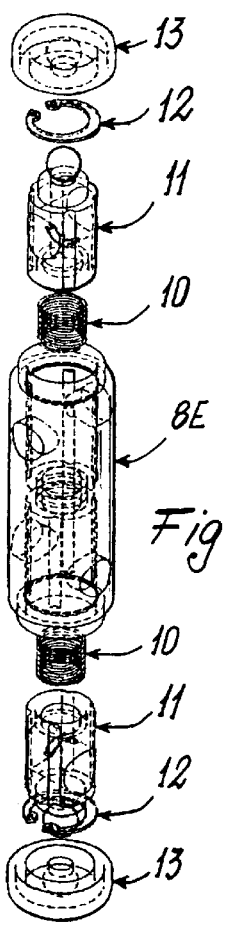
Figure 4C:
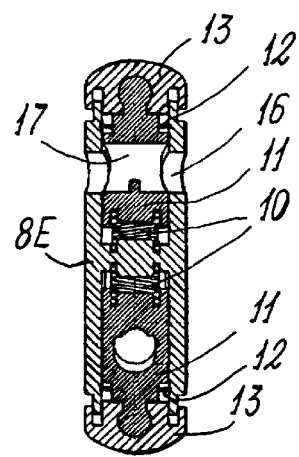
Figure 5:
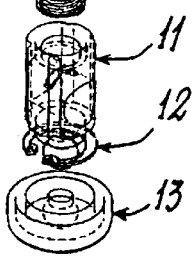
FIG. 5 is a partial view of a support pin according to the invention.

FIGS. 4A–4C show a clamping member comprising at both ends of the head 8E elastic clamping means of identical type to those described heretofore (those parts already described are indicated in FIGS. 4A–4C by the previously used numbers).

Using the clamping members shown in FIGS. 3A–3C and 4A–4C, cross-shaped support structures can be constructed for the guide elements or other components of the conveyor.

Advantageously, the heads 8, 8D, 8E, the movable elements 11 and the knobs 13 are formed from a conventional plastic suitable for the purpose, such as polyamide.

The head 8 could also be formed in one piece with the arm 6 (FIGS. 1 and 2A) as shown schematically in FIG. 1 and indicated by the arrow B.

Finally it should be noted that the aforedescribed embodiments are provided by way of example only, and that numerous modifications are possible all falling within the same inventive concept. For example the movable element 11 or the heads 8, 8D, 8E could be shaped differently and/or the spring 10 could be replaced by another conventional elastic element.

What is claimed is:

1. A clamping member comprising:
   a head having a seat structured and arranged for receiving at least one movable element;
   a first in;
   at least a first movable element arranged within said head, and wherein said first movable element and said head each comprise a hole for passage of said first pin, said first moveable element being structured and arranged for selectively securing said first pin within said holes;
   a resilient elastic element housed in said head and structured and arranged to exert a force in a first direction on said at least one movable element whereby a portion of the first pin inserted into the holes is secured within said head, said at least one movable element being structured and arranged to enable the first pin to be selectively released from said head by exerting a force on said first movable element in a second direction opposite to said first direction.

2. A clamping member as claimed in claim 1, wherein the first pin comprises at least one annular groove.

3. A clamping member as claimed in 1, wherein the head is formed in one piece and comprises a support arm.

4. A clamping member as claimed in claim 1, further comprising:
   an element for limiting the movement of the first movable element within the head.

5. A clamping member as claimed in claim 1, wherein the head and the first movable element comprise:
   elements for allowing the first movable element to move coaxially with respect to the head.

6. A clamping member as claimed in claim 1, further comprising;
   means for securing said clamping member to a support arm.

7. A clamping member as claimed in claim 1, further comprising:
   securing means for securing a second pin to said head, said securing means comprising a screw.

8. A clamping member as claimed in claim 7, wherein said first pin and said second pin are arranged at an angle with respect to one another.

9. A clamping member as claimed in claim 1, further comprising:
   a second movable element for selectively securing a second pin to said head, said first and second movable elements being arranged at opposite ends of said head.

10. A clamping member as claimed in claim 1, wherein said first movable element comprises a projecting element for locking said first pin, said projecting element being arranged to cooperate with annular grooves provided on said first pin.

11. A clamping member comprising:
    a head having a seat structured and arranged for receiving at least one movable element
    a first pin;
    at least a first movable element arranged within said head, and wherein said first movable element and said head each comprise a hole for passage for the first pin, said first moveable element being structured and arranged for selectively securing said first pine within said holes;
    a resilient elastic element housed in said head and structured and arranged such that said elastic element exerts a force in a first direction on said first movable element which in turn exerts a corresponding force in the first direction on the portion of the first pin inserted into the holes to thereby maintain the first pin within said head, said first movable element being structured and arranged to enable the first pin to be released from said head by exerting a force on said first movable element in a second direction opposite to said first direction; and
    a knob coupled to said first movable element to enable said force to be exerted on said movable element in said second direction thereby realigning said holes and allowing the pin to be withdrawn from said holes.

12. A clamping member as claimed in claim 11, wherein the first pin comprises at least one annular groove.

13. A clamping member as claimed in claim 11, wherein the at least one securing means further comprising:
    an element for limiting the movement of the movable element within the head.

14. A clamping member as claimed in claim 11, wherein the head and the first movable element comprise cooperating guide elements allowing the movable element to move coaxially with respect to the head.

15. A clamping member as claimed in 11, wherein the head is formed in one piece and comprises a support arm.

16. A clamping member as claimed in claim 11, further comprising:
    means for securing said clamping member to a support arm.

17. A clamping member as claimed in claim 11, further comprising:

securing means for securing a second pin to said head, said securing means comprising a screw.

18. A clamping member as claimed in claim 17, wherein said first pin and said second pin are arranged at an angle with respect to one another.

19. A clamping member as claimed in claim 11, further comprising:

a second movable element for selectively securing a second pin to said head, said first and second movable elements being arranged at opposite ends of said head.

\* \* \* \* \*